United States Patent [19]

Kaneda

[11] Patent Number: 4,865,164

[45] Date of Patent: Sep. 12, 1989

[54] POSITIVE SHUT-OFF POWER ASSISTED BRAKES

[76] Inventor: Mitsuharu Kaneda, 2836 Carolina St., San Pedro, Calif. 90505

[21] Appl. No.: 285,104

[22] Filed: Dec. 15, 1988

[51] Int. Cl.[4] .................. B60T 7/12; B60T 11/00; B60T 8/44; F15B 7/00

[52] U.S. Cl. ................... 188/141; 60/581; 60/589; 188/344; 188/346; 303/114

[58] Field of Search .............. 188/152, 140 A, 141, 188/344, 346, 181 T; 303/114; 60/562, 579, 581, 589, 593, 594

[56] References Cited

U.S. PATENT DOCUMENTS 3,700,075 10/1972 Mortimer et al. .................. 188/346
4,176,886 12/1979 Watanabe ......................... 60/581 X

FOREIGN PATENT DOCUMENTS 0001830 1/1988 Japan ............................. 188/344

Primary Examiner—Robert J. Oberleitner
Attorney, Agent, or Firm—John E. Halamka

[57] ABSTRACT

A mechanical arrangement to provide power assistance for the application of vehicle brakes with a positive shut-off of power assistance immediately upon release of the brake control by the user. The shut-off is achieved mechanically by providing pressure relief from the power assist pressure chamber by connecting a pressure relief channel between the power assist chamber and the brake fluid reservoir or by disconnecting the power piston in the power assist chamber from the main piston as soon as the brake control is released by the user.

19 Claims, 3 Drawing Sheets

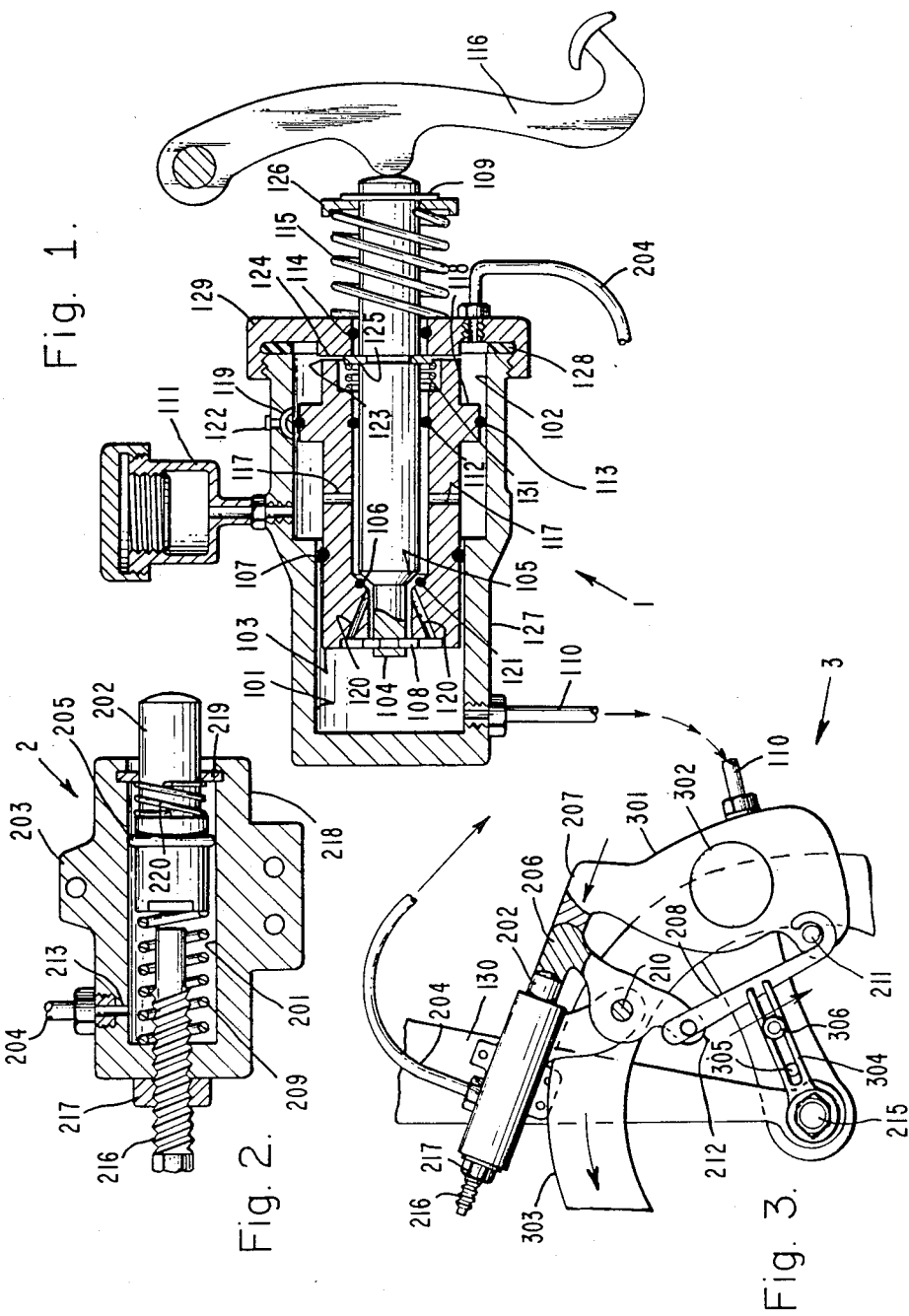

POSITIVE SHUT-OFF POWER ASSISTED BRAKES

This invention relates to the art of power assisted brakes and more particularly to the use of transrotational motion of the brake pad to create additional pressure on the brake pad but with an improved release of the additional pressure upon user release of the brake actuator.

BACKGROUND OF THE INVENTION

Vehicle brake systems generally have a nonrotational frictional member which may be placed in frictional engagement with a rotational member upon the application by the user of a brake actuator. The pressure applied by the frictional member upon the rotational member is proportional to the pressure applied by the user upon the brake actuator.

Prior art discloses systems to assist in the application of additional pressure either upon the brake actuator or directly to the frictional member. Some systems have used engine vacuum to enhance the pressure, applied either hydraulically or mechanically, to the frictional member.

Upon the application of the frictional member, brake pads, to the rotational member, brake disk or drum, the brake pads and housing experience a torque. This torque has been utilized by some systems to create additional hydraulic or mechanical pressure on the brake pads.

Safety considerations have limited what feedback systems may be utilized to transmit the torque into additional brake pressure. An open or negative feedback loop it totally unacceptable as the increased brake pressure simply creates more brake pressure until the vehicle is stopped. If the loop cannot be broken, the brakes cannot be released.

U.S. Pat. No. 3,044,580, H. J. Butler, discloses a mechanical system which use the torque of the brake pad housing to generate additional pressure on the brakes pedal. The brake pad housing is connected by a cable to the brake pedal. However, the feedback systems utilized do not incorporate a positive release in the loop. These systems rely upon a mechanical release of the brake pad upon the release of the brake pedal. But because this device is connected to the brake pedal, the release of the brake pedal by the user does not necessarily release this device.

This introduces a safety hazard to the user. The disengagement of the frictional member from the rotational member is not assured. The disengagement could be prevented because the device is also applying the brake pedal keeping the brake pad in engagement with the rotational member. The brake pad pressure could continue to be applied, increased by the power assist feedback loop and bring the vehicle to an abrupt, uncontrolled, and unexpected halt.

An approach to introduce a positive disconnect of the brake assistance pressure is shown in U.S. Pat. No. 3,664,468, H. Oka. This system relies upon a spring to act upon the mechanical levers rotated by the torque exerted upon the frictional member under the condition of the member engaged with the rotational member. The spring is to force the levers back to a neutral position. If the spring becomes weak, the levers will not be forced back to a neutral position. The assist pressure will not be released. Thus, the brake will stay engaged bringing the vehicle to a halt.

Some approaches to solve the problem have been to combine the mechanical feedback with a hydraulic feedback as shown in U.S. Pat. No. 3,700,075. This approach utilizes a limiter to compare the original user applied pressure to the power assistance pressure. A floating valve controlled by opposing springs will disengage the power assist pressure if it exceeds an upper threshold. However, the floating valve must be damped to avoid "hunting" during the application of the power assist pressure.

This solves the problem of continuous build-up of power assist pressure and avoids uncontrolled stops but does not solve the problem of positive disconnect of the power assist pressure as the damped floating valve must seek a position which allows the pressure on the primary brake to be released which in turn releases the pressure on the hydraulic feedback and threshold device.

Thus, there has long been a need for an arrangement to apply additional pressure on a brake pad through a feedback arrangement with a positive release action to stop the application of the additional pressure.

It is desired that the feedback system incorporate a positive disconnect of the power assist upon removal by the user of pressure from the brake control.

Further, it is desired that the feedback system give immediate response to the release of the brake control by immediately relieving the power assist feature.

It is further desired the the feedback system be adjustable to limit the amount of power assist available from the system.

It is yet further desired that the power assist system provide a measure of anti-lock prevention to prevent a "hard lock" situation which may reduce control of the vehicle during an emergency stop condition.

SUMMARY OF THE INVENTION

Accordingly, it is an object of the present invention to provide an improved power assisted brake system incorporating a feedback arrangement with a positive release feature.

It is another object of the present invention to provide an improved power assisted brake system which is immediately responsive to the release of brake control pressure by the user.

It is yet another object of the present invention to provide an improved power assisted brake system which the user can preselect the amount of power assistance available from the arrangement.

It is yet another object of the present invention to provide a measure of anti-lock function to remove at least a portion of the power assistance during wheel lock-up during an emergency stop condition.

The above and other objects of the present invention are achieved, according to a preferred embodiment thereof, by providing an improved power assisted brake arrangement in which, upon the release of pressure within the master cylinder by the user, the pressure of the power assist circuit is relieved.

In the preferred embodiment, the application of the brake control closes a valve between the master cylinder and the power assist pressure chamber. Upon user release of the brake control the valve is immediately opened and the power assist pressure is relieved halting any further application of the brake by the master cylinder or the power assist pressure chamber.

In another embodiment, the function of the valve is performed mechanically by a ball locking system which disengages the power assist feature immediately upon release of the brake control by the user.

In the preferred embodiment, the servo system which applies the power assist pressure is activated by the limited rotational movement of the brake caliper housing. An adjustable limiter may be added to the servo system to select the amount of power assist pressure generated by the arrangement.

Because the power assist pressure is activated by the limited movement of the caliper housing, during wheel "locks up" in an emergency stop the limited movement of the caliper housing is eased. Therefore, the pressure in the power assist will be reduced which in turn provides a partial release of the brake pressure granting a measure of anti-lock function to the arrangement.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 1 is a partially sectioned side view including a diagrammatic view of the preferred embodiment;

FIG. 2 is a partially sectioned side view of the servo actuator assembly;

FIG. 3 is a side view of the preferred embodiment illustrating the position of the movable parts thereof;

Figure 4:
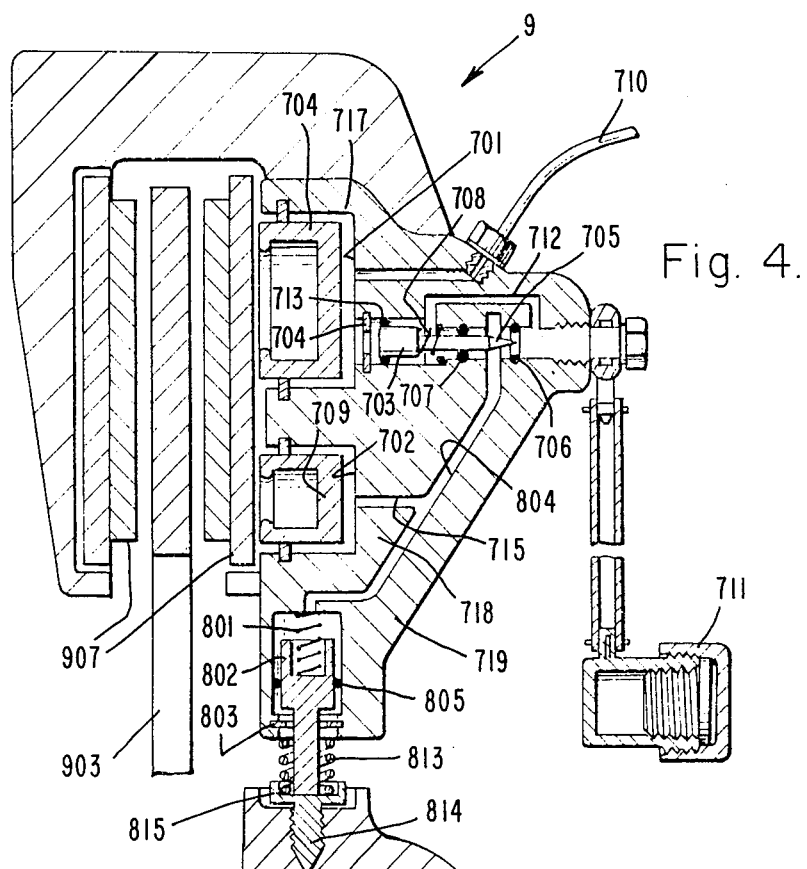
FIG. 4 is a sectional top view of another embodiment including a diagrammatic view of the dual caliper piston embodiment.

The master cylinder housing 127 of the brake master cylinder 1 is mounted on a vehicle in a position to be activated by the brake control 116.

Under the condition of the user engaging the brake control 116, the brake control 116 engages the end of the push rod 104. The valve surface 105 of the push rod 104 presses against the second reservoir seal 106 mounted in the valve surface 121 of the primary piston 103 and completes the seal of the primary pressure chamber 101. Further movement of the push rod 104 moves the main piston 103 forward creating hydraulic pressure within the primary pressure chamber 101. This increased pressure is transmitted by the brake hydraulic line 110 to the brake assembly 3 shown in FIG. 3.

The brake assembly 3 is a hydraulic friction brake system well known in the art and consists of a brake frame member 301 with limited rotational movement, a brake caliper assembly 302 with movable frictional pad and a brake rotational member 303 mounted on an axial 215 and fixed to a wheel of the vehicle. The axial 215 is mounted on the frame 130 of the vehicle. The brake limited rotational member 301 is pivotally mounted to the axial 215 of the vehicle to allow limited angular motion of the brake limited rotational member 301 upon engagement of the movable pad inside the brake caliper assembly 302 with the brake rotational member 303. Upon removal of the brake control pressure by the user, the brake caliper pressure is relieved. The brake frictional pad is released from the brake rotational member 303. The brake centering spring 304, mounted on the suspension arm of the vehicle 130, is limited in motion by centering spring stop 305 and moves the limited rotational member 301 back to the quiescent position by applying force to centering peg 306.

FIG. 2 shows the servo actuator 2 mountable on the suspension arm of the vehicle 130 by the servo mounting bracket 203 which is formed as a part of the servo actuator housing 218.

FIG. 3 shows the servo actuator arm having a first end 206 and a second end 212 pivotally mounted on the servo actuator 2 by pin 210. The limited angular motion of the brake frame member 301 during application of the brakes allows the activator head 207 to contact the first end of the actuator arm 206 upon what is shown in the drawing by an arrow as counter clockwise movement. Upon clockwise movement of the rotational member 303 and engagement of the frictional pad, the reverse linkage 208 pulls on the second end of the actuator arm 212 on the other side of the pivot mount 210 in the direction of the arrow as shown. One end of the reverse linkage 208 is pivotally mounted to the second end of the actuator arm 212. The other end of the reverse linkage 208 is slidably mounted to the brake frame 301 by the reverse action pin 211. Either clockwise or counterclockwise movement of the brake frame 301 engages the actuator arm 206 with the servo piston 202 mounted in the servo actuator 2.

FIG. 2 shows the servo piston 202 is mounted with the servo actuator housing 218 to form a servo chamber 201 containing fluid sealed in the servo chamber by servo seal 205. The servo piston 202 is retained within the servo actuator housing 218 by the servo snap ring 219. A servo spring 220 mounted between the servo snap ring 219 and the servo piston 202 maintains the servo piston in a floating position to avoid free play and the noise and chatter which would be caused by movement of the servo piston 202 against the servo actuator housing 218.

The inward movement of the servo piston 202 creates pressure within the servo actuator pressure chamber 201. The increased pressure of the chamber is communicated through the outlet port 213 by the servo hydraulic line 204 to the power assist pressure chamber 102.

The inward most movement of the servo piston 202 may be adjustably limited by moving the servo stop 216 inward along the servo actuator pressure chamber 201 to a preselected position. The servo stop 216 is locked in place by lock nut 217. This adjustment limits the amount of power assistance generated by the servo actuator 2 by limiting the inward movement of the servo piston 202.

In FIG. 1, the power assist pressure chamber 102 is contained by the wall 124 of the master cylinder cap 129 and the end 118 of the main piston 103.

The increased pressure within the chamber of the power assist pressure chamber 102 causes the main piston 103 to move forward creating additional pressure within the primary pressure chamber 101. The additional pressure is communicated by the brake hydraulic line 110 to the brake caliper assembly 302 increasing the pressure of the frictional pad upon the brake rotational member 303. The further increase of power assist pressure generated within the chamber of the servo actuator pressure chamber 201 is limited by the reverse force of the servo return spring 209 and of the push rod return spring 115 in the master cylinder 1.

Other factors must be considered in the design of the brake system such as the weight of the vehicle, the coefficient of friction of the brake pad, the change in the coefficient of friction due to heating of the brake pad during application of the brake, etc. The ratio of the outside diameter of the tire of the vehicle over the brake disk outside diameter varies the requirement of caliper pressure required to achieve a required stopping power.

The brake disk outside diameter is selected to be as large as possible.

The ratio of the outside diameter of the caliper piston (in assembly 302) to the master cylinder outside diameter (main piston 103 outside diameter) is normally 2 to 1 in the art of brake systems.

All of the performance factors of the brake system dictate the maximum braking force that can build up upon application of the brake pedal control 116 by the user with subsequent additional braking force applied by the invention herein. The user remains in the feedback loop and can release the pressure on the brake pedal and stop the application of braking force.

Immediately upon the release of the brake control 116, the push rod return spring 115 disengages the valve surface 105 of the push rod 104 from the second reservoir seal 106. Any pressure in the primary pressure chamber 101 is vented along the end of push rod 104 remote from the brake control 116 and relieved through the first pressure release channel 120. Both pressure release paths 120 connect through radially drilled channel 117 to the reservoir chamber 111.

In the preferred embodiment, a first pressure release channel 120 connects the primary pressure chamber 101 to the valve seat surface 121 below the second reservoir seal 106. Should dirt or deposits accumulate around the front snap ring 108, the pressure in the primary pressure chamber 101 may not be released along the push rod 104 and into the reservoir chamber 111. The first pressure release channel 120 provides a positive path for pressure relief of the primary pressure chamber 101.

Slight relaxing by the user in applying force on the brake control 116 allows the push rod return spring 115 to retract the valve surface 105 of the push rod 104 from the valve seat surface 121. Pressure in the primary pressure chamber 101 is partially vented with a proportionate decrease of the stopping force. Further release by the user of the brake control 116 engages the front snap ring 108 with the end of the main piston 103. The push rod return spring 115 supplies force to retract both the push rod 104 and the main piston 103 to a position which further reduces the pressure in the primary pressure chamber 101. Complete release of the brake control 116 allows the push rod return spring 115 to position the push rod 104 and piston 103 to the quiescent position with the brake completely disengaged. The return travel of the piston 103 is limited by the contact of the stop 123 with the wall 124 of master cylinder cap 129. The return travel of the push rod 104 is limited by the contact of the rear snap ring 125 with the wall 124 of master cylinder cap.

The push rod spring 131 is mounted between the rear snap ring 125 and the piston 103 to provide a positive separation of the push rod valve surface 105 from the second reservoir seal 106 and open the pressure release channel 120 between the primary pressure chamber 101 and the reservoir chamber 111.

The return spring 115 is held in place on the push rod 104 by the return spring cap 126 and the cap snap ring 109.

A second pressure release channel 119 connects the power assist pressure chamber 102 to the resevor chamber 111 under the condition of the push rod 104 being in the quiescent position and the user is not applying pressure on the brake control 116. Should conditions such as road surface cause any application of force on the servo piston 202, or should any other factors cause an increase of pressure in the servo hydraulic line 204, the increased hydraulic pressure will be vented through the second pressure release channel 119 into the resevor chamber 111.

The first resevor seal 113, mounted on the main piston 103 is mounted on a seat which is positioned between the ends of the second pressure release channel 119 during the quiescent phase of the system. As the user applies pressure to the brake control 116 to move the push rod 104 against the piston 103, the piston 103 moves forward. The first reservoir seal 113 first closes the end of the second pressure release channel 119 nearest the reservoir chamber 111. Further application of the brake control 116 moves the first reservoir seal 113 past the front opening of the second pressure release channel 119. Any pressure build-up in the power assist pressure chamber 102 is not relieved through the second pressure release channel 119 until the first reservoir seal 113 returns to its quiescent position between the ends of the second pressure release channel 119.

The bleed through screw 122 allows any trapped air present in the primary pressure chamber 101 and power assist pressure chamber 102 to be released while the brake system is quiescent. Any air in the servo system will be pumped into the power assist pressure chamber 102 where it will collect at the bled through screw 122.

Access to the primary pressure chamber 101 is available by removing the master cylinder cap 129 which is sealed to the master cylinder housing 127 by the gasket 128.

The push rod 104 is mounted through the master cylinder cap wall 124. Hydraulic seal is provided by the cap/push rod seal 114.

The push rod 104 is mounted through the main piston 103. Hydraulic seal is provided by the push rod/main piston seal 112.

The main piston 103 is mounted inside the master cylinder housing 127. Hydraulic seal is provided by the main piston/master cylinder housing seal 107 and by the first reservoir 113.

Figure 6:
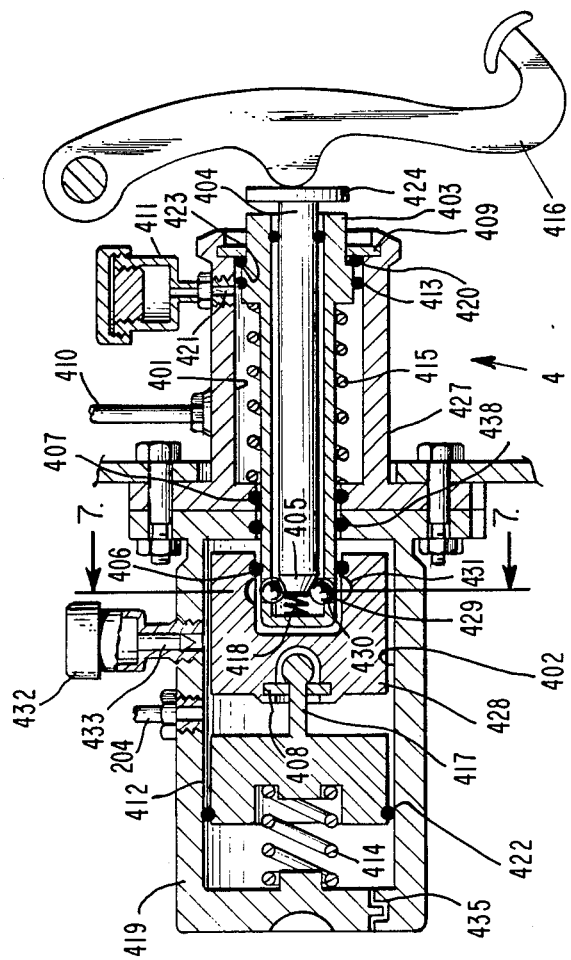
FIG. 6 is a partially sectioned side view of another embodiment.

Referring now to FIG. 6 of the drawing which diagrammatically shows another arrangement of the braking system with quick disconnect power assist according to the invention. In this embodiment, the hydraulic valve quick disconnect function is performed mechanically by a lock ball arrangement.

The master cylinder housing 427 of the brake master cylinder 4 is mounted on a vehicle in a position to be activated by the brake control 416.

The main piston 403 is mounted within the main cylinder housing 427. Hydraulic seal is achieved by the outside power seal 420.

The push rod seal 425 does not seal any hydraulic fluid but is placed between the piston 403 and the push rod 404 to guide the push rod 404 and aid in maintaining the push rod 404 within the piston 403.

The main piston 403 extends through the end of the main cylinder housing 427 and into the power assist cylinder housing 419. Hydraulic seal is achieved by the main piston/master cylinder seal 407 and the power assist chamber/main piston seal 438.

Under the condition of the user pushing on the brake control 416, the brake control engages the push rod cap 424 which in turn engages the main piston 403. The tapered end 405 of the push rod 404 presses against the plurality of lock balls 429 forcing the lock balls 429 from the lock ball seat 430 to engage the lock ball catch 431. Further movement of the push rod 404 moves the lock piston 428 along the power assist cylinder housing 419.

Figure 7:
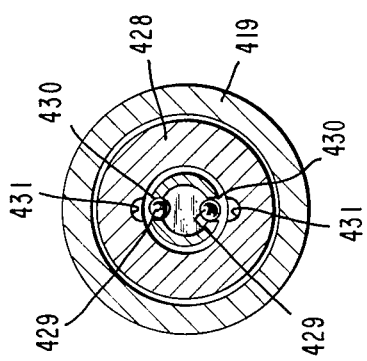
FIG. 7 is a cross-sectional view taken along line 7—7 in FIG. 6. cl DESCRIPTION OF A PREFERRED EMBODIMENT Referring now to the drawing, FIG. 1 diagrammatically shows the braking system with power assist according to the invention.

This is more clearly illustrated in FIG. 7 which shows a cross-sectional diagram at 7—7 of FIG. 6.

The forward movement of the main piston 403 moves the first reservoir seal 413 past the first pressure release channel 421 which is connected to the first reservoir 411. Further movement of the main piston 403 creates hydraulic pressure within the primary pressure chamber 401. This increased pressure is transmitted by the brake hydraulic line 410 to the brake assembly 3 previously shown in FIG. 3.

The lock ball arrangement is sealed from the Hydraulic fluid within the power assist pressure chamber 402 by the main piston/lock chamber seal 406.

The function of the brake assembly 3 and servo actuator 2 previously described above, functions to generate power assist hydraulic pressure and communicate it to the brake master cylinder 4 by the servo hydraulic line 204 whereby pressure is increased within the power assist pressure chamber 402.

The secondary piston 412 is mounted inside the power assist cylinder housing 419. The secondary piston seal 422 prevents fluid from entering the area shown in FIG. 6 to the left of the secondary piston 412 which is open to ambient atmospheric pressure through air channel 435.

The increased pressure within the chamber of the power assist pressure chamber 402 causes the secondary piston 412 to move to the left as depicted in FIG. 6. As the secondary piston connector 417 engages the snap ring 408, further movement of the secondary piston 412 to the left pulls the lock piston 428 which is engaged by means of the lock balls 429 to the main piston 403. The movement of the main piston 403 creates additional pressure within the primary pressure chamber 401. The additional pressure is communicated by the brake hydraulic line 410 to the brake caliper assembly 302 increasing the pressure of the frictional pad upon the brake rotational member 303. As explained before, FIG. 2 shows that the further increase of power assist pressure generated within the chamber of the servo actuator pressure chamber 201 is limited by the reverse force of the servo return spring 209 and of the main piston return spring 415 in the master cylinder 4.

Immediately upon the release of the brake control 416, the push rod return spring 418 disengages the tapered surface 405 of the push rod 404 from the plurality of lock balls 429 allowing the lock balls 429 to return to the lock ball seat 430 and disengage from the lock ball catch 431.

Any increased pressure in the power assist pressure chamber 402 will not increase the pressure in the primary pressure chamber 401 as the lock piston 428 is disengaged from the main piston 403 and cannot pull it forward, thus positively shutting off the power assist.

Slight relaxing by the user of applying force on the brake control 416 allows the main piston return spring 415 to return the main piston 403 toward the quiescent position. Pressure in the primary pressure chamber 401 is decreased with a proportionate decrease of the stopping force. Further release by the user of the brake control 416 releases the brake caliper assembly 302 shown in FIG. 3. The brake centering spring 304 pushes the activator head 207 away from the servo piston 202. The servo pressure transmitted by the servo hydraulic line 204 to the power assist pressure chamber 402 in FIG. 6 is positively relieved. The secondary piston 412 is returned to position by the secondary piston return spring 414. The secondary piston connector 417 pushes the lock piston 428 back to the quiescent to align the lock ball catch 431 with the lock ball 429.

Complete release of the brake control 416 allows the main piston return spring 415 to position the main piston 403 to the quiescent position with the brake completely disengaged. As the main piston 403 returns, the outside end of the main piston 403 engages the push rod cap 424 returning the push rod 404 to its nominal position with the lock piston 428 disengaged. The return travel of the main piston 403 is limited by the contact of the stop 423 with the outside power seal 420 next to the main piston snap ring 409.

The second reservoir 432 is mounted on the power assist cylinder housing 419. A one way valve 433 is mounted in the second reservoir 432. When required, the fluid in the power assist chamber 402 is replenished from the second reservoir 432 through the one way valve 433.

Figure 5:
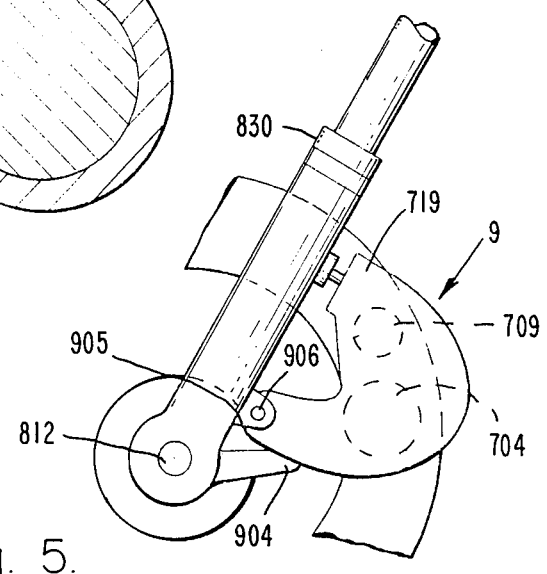
FIG. 5 is a side view of another embodiment illustrating the position of the movable parts thereof.

Another embodiment of the present invention is shown in FIG. 5. This embodiment shows the power assist arrangement and power assist cutoff contained within the limited rotational member assembly 9 mounted on the vehicle non-rotational suspension arm 830 by brake mounting bracket 905 and brake pivot pin 906.

As shown in FIG. 4, the limited rotational member assembly 9 contains a dual caliper piston arrangement, a brake caliper assembly 717 with movable piston 704 and a power assist cylinder housing 718 with movable piston 709. The limited rotational member assembly 9 also contains a servo actuator assembly 719.

The brake control and brake master cylinder used with the limited rotational member assembly 9 may be similar to that well known in the art. To this art is added a positive power assist shut off arrangement contained in the assembly 9. As the user applies the brake control, the hydraulic pressure in the brake master cylinder is increased. The pressure is communicated to the limited rotational member assembly 9 by the brake hydraulic line 710 shown in FIG. 4. The movement of the limited rotational member assembly 9 shown in FIG. 5 is in an arc centered on the pivot 906. The counter clockwise movement of the limited rotational member assembly 9 is controlled by the placement of the stopper 904.

As demonstrated in FIG. 4, as increased hydraulic pressure is applied, the main brake caliper piston 704 is pushed against the frictional pad 907. The frictional pad 907 is pushed against the brake rotational member 903 which is mounted on axial 812, shown in Figure 5. The rotational force of the brake rotational member 903 causes the limited rotational member assembly 9 to move the exposed end of the servo piston 802 against the servo tension adjuster 814 mounted on the vehicle non-rotational suspension arm 830 of the vehicle and held in a preselected position by the servo tension adjuster lock nut 815. This rotational movement of the rotational member 903 is limited by the adjustment of the servo tension adjuster 814. The tension adjuster 814 may be adjusted and moved toward the limited rotational member assembly 9. As the servo tension adjuster 814 moves, it depresses the servo piston 802 which is mounted within the servo cylinder 801 and held in place by the servo snap ring 803. The servo piston seal 805 between the servo cylinder 801 and servo piston 802 directs any hydraulic pressure generated within the servo cylinder 801 to be vented through the servo hydraulic line 804 past the valve surface 705 and valve seal 706, if open, to the reservoir 711. If the valve surface 705 is engaged with the valve seal 706, the increased pressure is communicated through power assist hydraulic line 715 to the power assist pressure chamber 702. If the servo piston 802 starts in a depressed position as adjusted by the extension of the servo tension adjuster 814, the movement of the limited rotational member assembly 9 will generate less power assist before resting against servo tension adjuster 814.

The servo tension spring 813 which is mounted on the end of the servo piston 802 returns the limited rotational member assembly 9 to the quiescent position upon the removal of braking force by the user.

As the increased pressure from the brake master cylinder is communicated by the brake hydraulic line 710 to the main brake caliper chamber 701, the main brake caliper piston 704 and the control piston 703 move in response to the increased pressure. The main brake caliper piston 704 is moved against the frictional pad 907. The control piston 703 is moved toward the valve seal 706. One end of the control piston 703 is formed as a valve surface 705. Under the condition of the valve surface 705 in contact with the valve seal 706, the pressure relief path along the servo hydraulic line 804 and along power assist hydraulic line 715 to the reservoir 711 is closed.

As the control piston 703 moves along the rear control piston seal 713, hydraulic pressure between the seal 713 and the control piston seal 707 within the control piston chamber 716 is vented along the control piston pressure relief channel 712 to the reservoir 711. The control piston seal 707 isolates the servo hydraulic line 804 from the control piston pressure relief channel 712.

Upon movement of the limited rotational member assembly 9, servo piston 802 is depressed. The pressure in the servo cylinder 801 is increased and communicated through servo hydraulic line 804 and power assist hydraulic line 715 to the power assist pressure chamber 702. With the increased pressure, the servo brake caliper piston 709 is moved to engage the frictional pad 907 and increase the pressure of the frictional pad 907 against the brake rotational member 903.

In the preferred embodiment shown in FIG. 4, the power assist caliper piston 709 is shown mounted to one side of the main brake caliper piston 704. The pressure applied to the frictional pad 907 will be uniform even though the caliper assemblies are offset. It may be possible to mount the servo brake caliper piston 709 within the main brake caliper piston 704 to apply pressure in the center portion of the frictional pad 907 while the main brake caliper piston 704 applies pressure on the periphery of the frictional pad 907.

Upon removal of pressure in the brake hydraulic line 710 by the user, the control piston return spring 708 forces the control piston 703 to its quiescent position against snap ring 704 which prevents further movement of the control piston 703. This movement of the control piston 703 opens the path from the servo hydraulic line 804 to the reservoir 711.

All power assist pressure is immediately relieved and a positive shutoff of all power assist is achieved.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An improved power assisted brake assembly comprising, in combination:
   a master cylinder housing forming a primary pressure chamber containing fluid;
   a power assist pressure chamber, within said master cylinder housing and separated from said primary pressure chamber, having a wall and containing fluid;
   a reservoir chamber;
   a main piston mounted inside said master cylinder between said primary pressure chamber and said power assist pressure chamber;
   a first reservoir seal mounted on said main piston;
   a push rod engagable with said main piston;
   a brake control engagable with said push rod;
   first pressure release channel communicating with said primary chamber and said reservoir chamber being closed upon the condition of activation of engagement of said brake control with said push rod whereby said first reservoir seal is interposed between said primary chamber and said first pressure release channel;
   second pressure release channel communicating with said power assist pressure chamber and said reservoir chamber;
   a second reservoir seal mounted adjacent said second pressure chamber and interposed between said power assist pressure chamber and said reservoir chamber upon the condition of activation of engagement of said brake control with said push rod;
   a non-rotational suspension arm;
   an axial mounted on said suspension arm;
   a rotational member mounted on said axial;
   a limited rotational member, slidably mounted on said suspension arm;
   a brake caliper, mounted on said limited rotational member, having a movable frictional pad engagable with said rotational member and communicating with said primary pressure chamber to move said frictional pad into engagement in response to activation of said brake control;
   a servo actuator forming a servo actuator pressure chamber containing fluid, mounted on said suspension arm, communicating with said power assist pressure chamber and engagable by said limited rotational member under the condition of said frictional pad engaged with said rotational member whereby the fluid pressure within said servo actuator pressure chamber is increased and communicated to said power assist pressure chamber whereby said main piston communicates said increased power assist pressure to said primary pressure chamber increasing activation of said brake caliper movable frictional pad;
   a rear snap ring mounted on said push rod at a preselected position to limit the return movement of said push rod; and, a push rod return spring engaging and moving said push rod under the condition of disengagement of said brake control whereby said first pressure release channel is opened.

2. An improved power assisted brake assembly defined in claim 1 further comprising:
   a stop mounted on said main piston and engagable with said wall of said power assist pressure chamber; and,
   a front snap ring mounted on said push rod and engagable with said main piston under the condition of disengagement of said brake control whereby said push rod and said main piston are moved by said push rod return spring to their quiescent position of said stop being in engagement with said wall.

3. An improved power assisted brake assembly defined in claim 1 further comprising:
   a push rod spring mounted between said rear snap ring and said main piston to separate said push rod from said main piston under the condition of disengagement of said brake control.

4. An improved power assisted brake assembly defined in claim 1 wherein said servo actuator further comprises, in combination:
   a fluid outlet port communicating with said servo actuator pressure chamber;
   an adjustable servo stop mounted in said servo actuator pressure chamber;
   a servo piston slidably movable in said servo actuator pressure chamber with a first end engagable with said limited rotational member and a second end engagable with said servo stop; and,
   a servo piston return spring.

5. An improved power assisted brake assembly defined in claim 1 wherein said slidably mounting of said limited rotational member allows preselected limited rotational movement in a first direction under the condition of said rotational member rotating in said first direction and preselected limited rotational movement opposite said first direction under the condition of said rotational member rotating opposite said first direction.

6. An improved power assisted brake assembly defined in claim 5 further comprising:
   a limited rotational member centering spring mounted on said suspension arm;
   a stop pin mounted on said suspension arm and engagable with said centering spring; and,
   a centering peg mounted on said limited rotational member and engagable with said centering spring being moved by said centering sprint to the quiescent position under the condition of disengagement of said brake control.

7. An improved power assisted brake assembly defined in claim 5 further comprising:
   an actuating arm having a first end and a second end pivotally mounted on said suspension arm at a preselected distance between said ends, said first end engagable with said servo actuator;
   reverse linkage, having a first end and a second end, said first end pivotally mounted on said second end of said actuating arm; and,
   said limited rotational member further comprising;
   an activator head engagable with said first end of said actuating arm under the condition of said rotational member rotating in a first direction whereby said actuating arm engages said servo actuator; and,
   a reverse action pin engagable with said second end of said reverse linkage whereby said actuating arm is pivotally engagable with said servo actuator under the condition of said rotational member rotating in reverse of said first direction.

8. An improved power assisted brake assembly defined in claim 1 further comprising:
   a valve surface mounted on said push rod;
   a valve seat surface mounted on said piston and engagable with said valve surface; and,
   a valve seal mounted in said valve seat surface between the first pressure release channel and said reservoir chamber.

9. An improved power assisted brake assembly defined in claim 1 further comprising:
   an actuating arm having a first end and a second end, pivotally mounted on said non-rotational suspension arm at a preselected point between said first end and said second end, said first end engagable with said limited rotational member and said servo actuator under the condition of said frictional pad engaged with said rotational member rotating in one direction;
   a reverse action pin mounted on said limited rotational member; and,
   a reverse linkage having a first end pivotally mounted on said second end of said actuating arm and a second end slidably engagable with said reverse action pin under the condition of said frictional pad engaged with said rotational member rotating in the other direction whereby said actuation arm is moved to engage said servo actuator.

10. An improved power assisted brake assembly defined in claim 1 wherein:
    said servo actuator including a servo actuator housing;
    a servo piston, having a first end and a second end, mounted in said servo actuator housing, said first end engagable with said limited rotational member;
    an adjustable stop mounted in said servo actuator housing adjacent said second end of said servo piston limiting the travel of said servo piston; and,
    a servo return spring engaging and moving said servo piston under the condition of disengagement of said brake control.

11. An improved power assisted brake assembly comprising, in combination:
    a master cylinder housing forming a primary pressure chamber containing fluid;
    a power assist cylinder housing mounted on said master cylinder housing;
    a power assist pressure chamber, within said power assist cylinder housing and separated from said primary pressure chamber, having a wall and containing fluid;
    a first reservoir chamber;
    a main piston mounted inside said master cylinder between said primary pressure chamber and said power assist pressure chamber having a plurality of lock ball seats;
    a secondary piston mounted inside said power assist cylinder housing;
    a lock piston mounted inside said power assist cylinder housing and slidably engaged with said secondary piston and said main piston and having a plurality of lock ball catches mounted adjacent to said plurality of lock ball seats;
    a plurality of lock balls mounted in said lock ball seats and engagable with said lock ball catches;
    a first reservoir seal mounted on said main piston;

a push rod having a tapered first end engagable with said lock balls and a second end having a cap engagable with said main piston;

a brake control engagable with said cap of said push rod and moving said tapered first end of said push rod thereby engaging said lock balls with said lock ball catches and connecting said main piston and said lock piston;

first pressure release channel communicating with said primary chamber and said first reservoir chamber being closed upon the condition of activation of engagement of said brake control with said push rod cap whereby said first reservoir seal is interposed between said primary chamber and said first pressure release channel;

a second reservoir chamber;

second pressure release channel communicating with said power assist pressure chamber and said second reservoir chamber;

a one way valve mounted in said second pressure release channel;

a non-rotational suspension arm;

an axial mounted on said suspension arm;

a rotational member mounted on said axial;

a limited rotational member, slidably mounted on said suspension arm;

a brake caliper, mounted on said limited rotational member, having a movable frictional pad engagable with said rotational member and communicating with said primary pressure chamber to move said frictional pad into engagement in response to activation of said brake control;

a servo actuator forming a servo actuator pressure chamber containing fluid, mounted on said suspension arm, communicating with said power assist pressure chamber and engagable by said limited rotational member under the condition of said frictional pad engaged with said rotational member whereby the fluid pressure within said servo actuator pressure chamber is increased and communicated to said power assist pressure chamber whereby said secondary piston communicates said increased power assist pressure to said primary pressure chamber increasing activation of said brake caliper movable frictional pad;

a rear snap ring mounted on said master cylinder housing at a preselected position to limit the return movement of said main piston;

a push rod return spring engaging and moving said push rod under the condition of disengagement of said brake control whereby said lock balls are disengaged from said lock ball catches disengaging the power assist;

a main piston return spring engaging and moving said main piston into engagement with said push rod under the condition of disengagement of said brake control whereby said first pressure release channel is opened; and, a secondary piston return spring mounted in said power assist cylinder housing between said wall and said secondary piston, returning said secondary piston and said lock piston to their quiescent position upon the condition of the disengagement of said brake control.

12. An improved power assisted brake assembly defined in claim 11 further comprising:

a stop mounted on said main piston and engagable with said rear snap ring under the condition of disengagement of said brake control whereby said push rod and said main piston are moved by said push rod return spring to their quiescent position of said stop being in engagement with said snap ring.

13. An improved power assisted brake assembly defined in claim 11 further comprising:

a push rod spring mounted between said push rod and said main piston to separate said push rod from said main piston under the condition of disengagement of said brake control.

14. An improved power assisted brake assembly defined in claim 11 wherein said servo actuator further comprises, in combination:

a fluid outlet port communicating with said servo actuator pressure chamber;

an adjustable servo stop mounted in said servo actuator pressure chamber;

a servo piston slidably movable in said servo actuator pressure chamber with a first end engagable with said limited rotational member and a second end engagable with said servo stop; and, a servo piston return spring.

15. An improved power assisted brake assembly defined in claim 11 wherein said slidably mounting of said limited rotational member allows preselected limited rotational movement in a first direction under the condition of said rotational member rotating in said first direction and preselected limited rotational movement opposite said first direction under the condition of said rotational member rotating opposite said first direction.

16. An improved power assisted brake assembly defined in claim 15 further comprising:

a limited rotational member centering spring mounted on said suspension arm;

a stop pin mounted on said suspension arm and engagable with said centering spring; and, a centering peg mounted on said limited rotational member and engagable with said centering spring being moved by said centering spring to the quiescent position under the condition of disengagement of said brake control.

17. An improved power assisted brake assembly defined in claim 15 further comprising:

an actuating arm having a first end and a second end pivotally mounted on said suspension arm at a preselected distance between said ends, said first end engagable with said servo actuator;

reverse linkage, having a first end and a second end, said first end pivotally mounted on said second end of said actuating arm; and, said limited rotational member further comprising;

an activator head engagable with said first end of said actuating arm under the condition of said rotational member rotating in a first direction whereby said actuating arm engages said servo actuator; and, a reverse action pin engagable with said second end of said reverse linkage whereby said actuating arm is pivotally engagable with said servo actuator under the condition of said rotational member rotating in reverse of said first direction.

18. An improved power assisted brake assembly defined in claim 11 further comprising:

an actuating arm having a first end and a second end, pivotally mounted on said non-rotational suspension arm at a preselected point between said first end and said second end, said first end engagable with said limited rotational member and said servo actuator under the condition of said frictional pad engaged with said rotational member rotating in one direction;

a reverse action pin mounted on said limited rotational member; and, a reverse linkage having a first end pivotally mounted on said second end of said actuating arm and a second end slidably engagable with said reverse action pin under the condition of said frictional pad engaged with said rotational member rotating in the other direction whereby said actuation arm is moved to engage said servo actuator.

19. An improved power assisted brake assembly defined in claim 11 wherein:

said servo actuator including a servo actuator housing;

a servo piston, having a first end and a second end, mounted in said servo actuator housing, said first end engagable with said limited rotational member;

an adjustable stop mounted in said servo actuator housing adjacent said second end of said servo piston limiting the travel of said servo piston; and, a servo return spring engaging and moving said servo piston under the condition of disengagement of said brake control.

* * * * *